US009145765B2

(12) United States Patent
Gabriel (10) Patent No.: US 9,145,765 B2
(45) Date of Patent: Sep. 29, 2015

(54) PLUNGER FOR DOWNHOLE PUMPS

(75) Inventor: Ron Gabriel, Van, TX (US)

(73) Assignee: Lubri-Pump, Inc., Van, TX (US)

(*) Notice: Subject to any disclaimer, the term of this patent is extended or adjusted under 35 U.S.C. 154(b) by 906 days.

(21) Appl. No.: 13/317,311

(22) Filed: Oct. 14, 2011

(65) Prior Publication Data

US 2012/0148431 A1    Jun. 14, 2012

Related U.S. Application Data (60) Provisional application No. 61/455,215, filed on Oct. 15, 2010.

(51) Int. Cl.
| F16J 9/00 | (2006.01) |
| E21B 43/12 | (2006.01) |
| F16J 15/32 | (2006.01) |

(52) U.S. Cl.
CPC .............. *E21B 43/126* (2013.01); *F16J 15/32* (2013.01)

(58) Field of Classification Search
CPC .................................. F16J 15/32; F16J 1/005
USPC ............ 92/175, 250–252; 166/372, 105, 106, 166/153; 417/551.1, 551.2
See application file for complete search history.

(56) References Cited

U.S. PATENT DOCUMENTS

| 2,049,265 A | 7/1936 | Kinney |
| 2,725,264 A | 11/1955 | Bodine, Jr. |
| 3,168,052 A | 2/1965 | Pate |
| 3,489,445 A | 1/1970 | Kammerer, Jr. |
| 3,689,206 A | 9/1972 | Meripol |
| 3,773,441 A * | 11/1973 | Schertz ........................ 417/554 |
| 4,003,669 A | 1/1977 | Fenske et al. |
| 4,757,861 A | 7/1988 | Klyne |
| 4,919,202 A | 4/1990 | Clintberg |
| 5,120,203 A * | 6/1992 | Priestly ........................ 417/554 |
| 5,752,814 A | 5/1998 | Starks et al. |
| 6,368,084 B1 | 4/2002 | Skillman |
| 6,406,028 B1 * | 6/2002 | Kannan ........................ 277/361 |
| 2005/0279494 A1 | 12/2005 | Sachdeva et al. |
| 2006/0273601 A1 | 12/2006 | Carstensen |
| 2007/0089876 A1 | 4/2007 | Michael et al. |
| 2009/0053087 A1 * | 2/2009 | Ford .............................. 417/520 |

* cited by examiner

Primary Examiner — Edward Look
Assistant Examiner — Daniel Collins
(74) Attorney, Agent, or Firm — R. Keith Harrison (57) ABSTRACT

A pump plunger for a sucker rod pump includes an elongated plunger body having first and second plunger body ends and a longitudinal plunger body bore extending between the first and second plunger body ends, a first plunger end fitting releasably carried by the first plunger body end of the plunger body, a second plunger end fitting releasably carried by the second plunger body end of the plunger body, a first plunger seal pack sandwiched between the first plunger body end and the first plunger end fitting and a second plunger seal pack sandwiched between the second plunger body end and the second plunger end fitting.

13 Claims, 8 Drawing Sheets

PLUNGER FOR DOWNHOLE PUMPS

CROSS-REFERENCE TO RELATED APPLICATIONS

This application claims the benefit of U.S. provisional application No. 61/455,215, filed Oct. 15, 2010 and entitled "PLUNGER FOR DOWNHOLE PUMPS", which provisional application is incorporated by reference herein in its entirety.

FIELD

The disclosure generally relates to sucker rod pumps, including tubing pumps and insert pumps for pumping well fluids from a hydrocarbon well. More particularly, the disclosure relates to a plunger for sucker rod pumps, which plunger has enhanced and prolonged sealing characteristics.

BACKGROUND

Conventional sucker rod pumps including tubing pumps and insert pumps include a pump plunger which reciprocates inside a pump barrel. The reciprocating pump plunger creates a pressure differential which draws hydrocarbons and other well fluids from a subterranean well to a suitable storage reservoir which may be located at ground level. One of the problems commonly encountered in the operation of conventional sucker rod pumps is that of blowback or slippage of produced fluids and solids down the pump between the reciprocating plunger and the barrel. Various types of seals and O-rings have been used to seal the void between the plunger and barrel and prevent the slippage of fluids and solids. These seals and O-rings, however, have limitations on operating durability, pump speed, depth and temperature, resulting in lost pump efficiency and the need for more frequent pump repairs or replacements.

Accordingly, a pump plunger with enhanced and prolonged sealing characteristics for a sucker rod pump is needed.

SUMMARY

The disclosure is generally directed to a pump plunger for a sucker rod pump. An illustrative embodiment of the pump plunger includes an elongated plunger body having first and second plunger body ends and a longitudinal plunger body bore extending between the first and second plunger body ends, a first plunger end fitting releasably carried by the first plunger body end of the plunger body, a second plunger end fitting releasably carried by the second plunger body end of the plunger body, a first plunger seal pack sandwiched between the first plunger body end and the first plunger end fitting and a second plunger seal pack sandwiched between the second plunger body end and the second plunger end fitting.

The disclosure is further generally directed to an end fitting for a pump plunger of a sucker rod pump. An illustrative embodiment of the end fitting includes an end fitting body; a threaded end fitting nipple carried by the end fitting body; a threaded end fitting shaft carried by the end fitting body; an end fitting bore extending through the end fitting body, the end fitting nipple and the end fitting shaft; and a plunger seal pack having a plurality of nesting plunger seals assembled on the end fitting shaft.

The disclosure is further generally directed to a plunger seal pack for a pump plunger of a sucker rod pump. An illustrative embodiment of the plunger seal pack includes a lead plunger seal, at least one middle plunger seal nesting with the lead plunger seal and a following plunger seal nesting with the at least one middle plunger seal.

In some embodiments, the pump plunger for a sucker rod pump may include an elongated plunger body having first and second plunger body ends and a longitudinal plunger body bore extending between said first and second plunger body ends; a first plunger end fitting releasably carried by said first plunger body end of said plunger body; a second plunger end fitting releasably carried by said second plunger body end of said plunger body; a first plunger seal pack having a following plunger seal and a lead plunger seal sandwiched between said first plunger body end and said first plunger end fitting; and a second plunger seal pack having a following plunger seal and a lead plunger seal sandwiched between said second plunger body end and said second plunger end fitting.

In some embodiments, the pump plunger for a sucker rod pump may include an elongated plunger body having first and second plunger body ends and a longitudinal plunger body bore extending between the first and second plunger body ends; a first plunger end fitting releasably carried by the first plunger body end of the plunger body; a second plunger end fitting releasably carried by the second plunger body end of the plunger body; a first plunger seal pack having a following plunger seal and a lead plunger seal sandwiched between the first plunger body end and the first plunger end fitting; and a second plunger seal pack having a following plunger seal and a lead plunger seal sandwiched between the second plunger body end and the second plunger end fitting.

In some embodiments, the pump plunger for a sucker rod pump may include an elongated plunger body having first and second plunger body ends and a longitudinal plunger body bore extending between the first and second plunger body ends; a first male plunger end integral with the first plunger body end of the plunger body; a second male plunger end integral with the second plunger body end of the plunger body; a first plunger seal pack having at least one first plunger seal detachably carried by the first male plunger end by sliding of said at least one plunger seal over said first male plunger end; and a second plunger seal pack having at least one second plunger seal detachably carried by the second male plunger end by sliding of said at least one plunger seal over said second male plunger end.

BRIEF DESCRIPTION OF THE DRAWINGS

The disclosure will now be made, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the invention and are not intended to limit the scope of the invention, which is defined by the claims. Furthermore, there is no intention to be bound by any expressed or implied theory presented in the preceding technical field, background, brief summary or the following detailed description.

Figure 1:
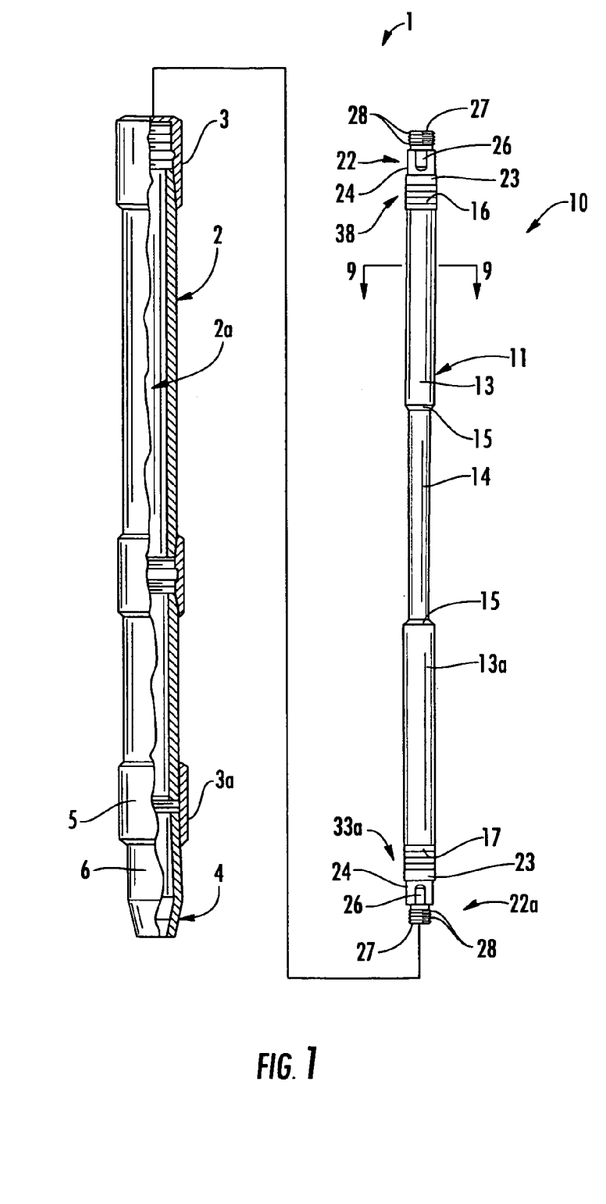
FIG. 1 is an exploded side view, partially in section, of a pump barrel and an illustrative embodiment of the pump plunger, more particularly illustrating insertion of the pump plunger into the pump barrel in assembly of a sucker rod pump.

Referring initially to FIG. 1 of the drawings, a typical sucker rod pump is generally indicated by reference numeral 1. The sucker rod pump 1 includes a generally elongated, cylindrical pump barrel 2 having a longitudinal pump barrel bore 2a (FIG. 1). A pump plunger 10 is mounted for reciprocation in the pump barrel bore 2a of the pump barrel 2. In some embodiments, an upper pump barrel coupling 3 and a lower pump barrel coupling 3a may be provided generally at upper and lower ends, respectively, of the pump barrel 2. The lower pump barrel coupling 3a may couple an extension nipple 4 to the pump barrel 2. The extension nipple 4 may include a tubing coupler 5 and a seating nipple 6. In some embodiments, the pump barrel 2 may have alternative designs which may or may not include the lower pump barrel coupling 3a, the extension nipple 4, the tubing coupler 5 and the seating nipple 6. The pump plunger 10 can be constructed of any suitable material including an aluminum-bronze alloy or stainless steel, in non-exclusive particular, as well as like materials commonly used in sucker rod pumps designed for oil well applications.

Figure 2:
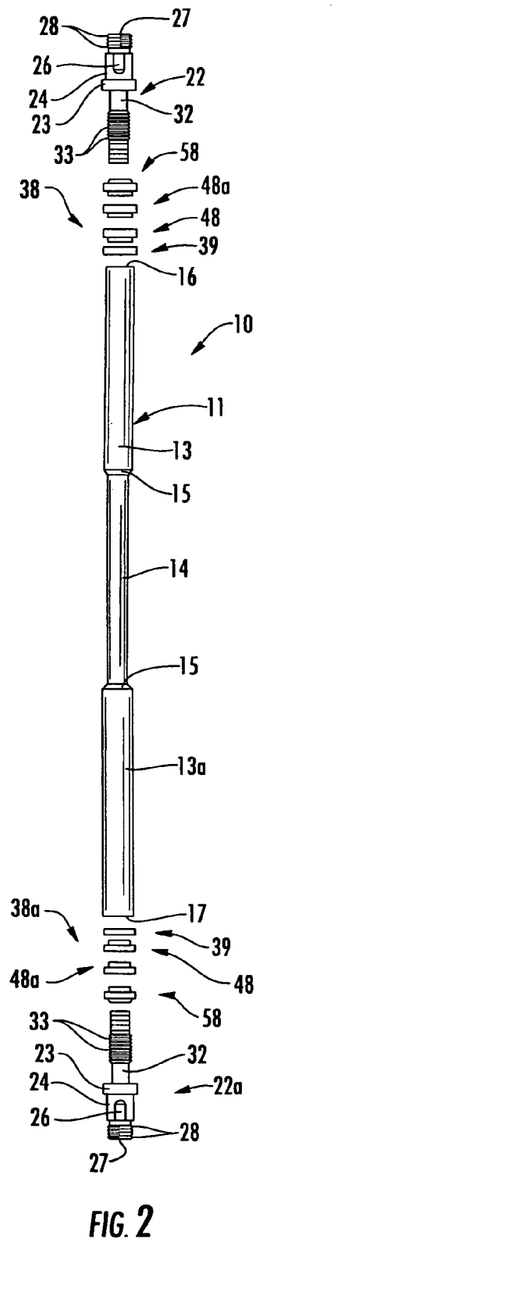
FIG. 2 is an exploded side view of the pump plunger.
Figure 10:
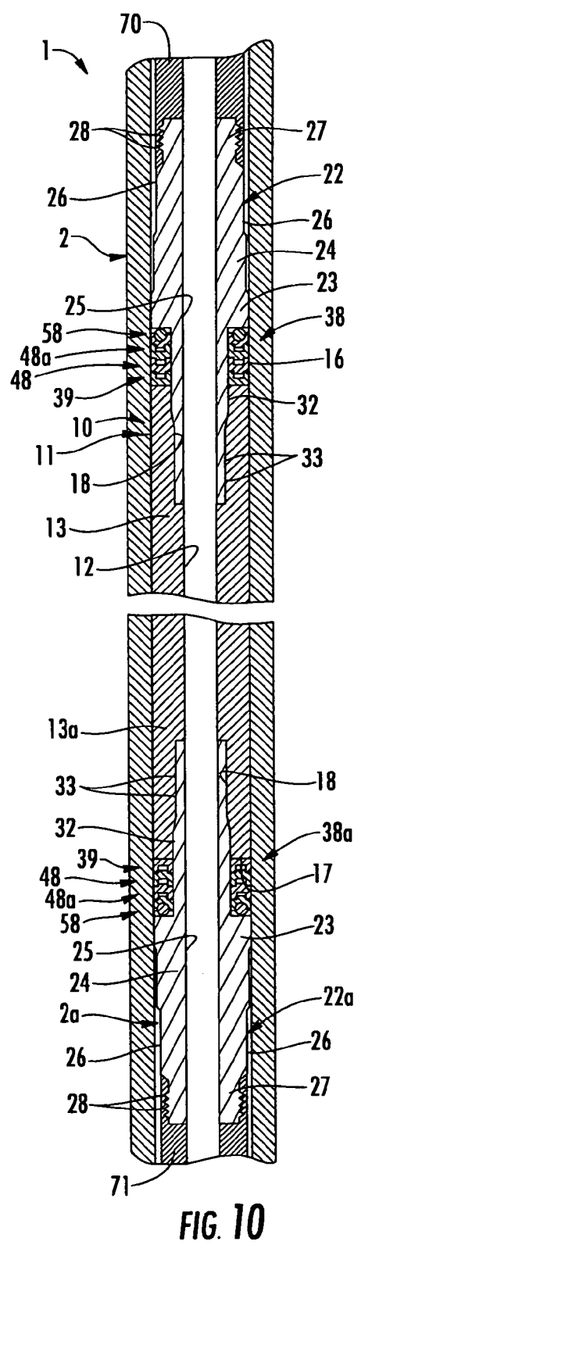
FIG. 10 is a longitudinal sectional view, partially in section, of the sucker rod pump.

Referring next to FIGS. 1-10 of the drawings, the pump plunger 10 may include a generally elongated plunger body 11 having a longitudinal plunger body bore 12 (FIG. 9) through which the hydrocarbons and other well fluids (not illustrated) are pumped during operation of the sucker rod pump 1. The plunger body 11 of the pump plunger 10 may have an upper expanded plunger portion 13, a lower expanded plunger portion 13a and a narrowed middle plunger portion 14 which connects the upper expanded plunger portion 13 and the lower expanded plunger portion 13a. A plunger bevel 15 may extend between the middle plunger portion 14 and the upper expanded plunger portion 13 and between the middle plunger portion 14 and the lower expanded plunger portion 13a, respectively. As illustrated in FIG. 2, the plunger body 11 may have an upper plunger end 16 and a lower plunger end 17. As illustrated in FIG. 10, internal plunger threads 18 may be provided in the plunger body bore 12 at the upper plunger end 16 and the lower plunger end 17 of the plunger body 11 for purposes which will be hereinafter described.

Figure 3:
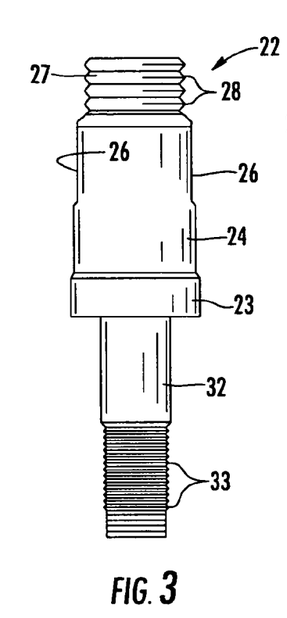
FIG. 3 is a side view of a plunger end fitting of the pump plunger.
Figure 4:
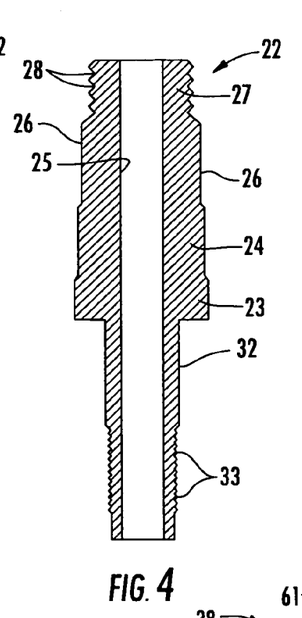
FIG. 4 is a longitudinal sectional view of the plunger end fitting.
Figure 5:
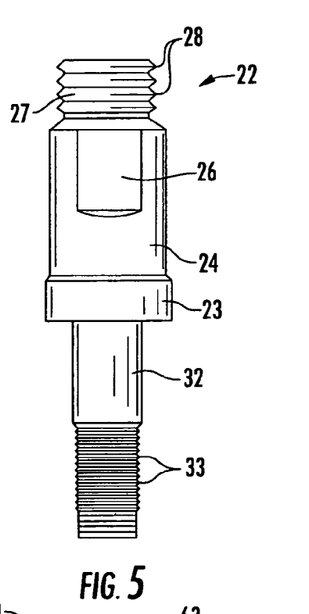
FIG. 5 is a side view of the plunger end fitting, rotated 90 degrees with respect to the side view of the plunger end fitting illustrated in FIG. 3.

An upper plunger end fitting 22 may be provided on the upper plunger end 16 of the pump plunger 10. A lower plunger end fitting 22a may be provided on the lower plunger end 17 of the pump plunger 10. As illustrated in FIGS. 3-5, each of the upper plunger end fitting 22 and the lower plunger end fitting 22a may include a generally cylindrical end fitting base 23. A generally cylindrical end fitting body 24 may extend from the end fitting base 23. End fitting flats 26 may be provided in opposite surfaces of the end fitting body 24 for purposes which will be hereinafter described. An end fitting nipple 27 having nipple threads 28 may extend from the end fitting body 24.

A generally elongated, cylindrical end fitting shaft 32 may extend from the end fitting base 23 opposite the end fitting body 24. Exterior shaft threads 33 may be provided on the end fitting shaft 32 for purposes which will be hereinafter described. A longitudinal end fitting bore 25 (FIG. 4) may extend through the end fitting nipple 27, the end fitting body 24, the end fitting base 23 and the end fitting shaft 32. As illustrated in FIG. 10, the upper plunger end fitting 22 may be attached to the upper plunger end 16 of the plunger body 11 by inserting the end fitting shaft 32 of the upper plunger end fitting 22 into the plunger body bore 12 at the upper plunger end 16 and rotating the upper plunger end fitting 22 to cause engagement of the exterior shaft threads 33 on the end fitting shaft 32 with the interior plunger threads 18 in the plunger body bore 12. In like manner, the lower plunger end fitting 22a may be attached to the lower plunger end 17 of the plunger body 11 by inserting the end fitting shaft 32 of the lower plunger end fitting 22a into the plunger body bore 12 at the lower plunger end 17 and rotating the lower plunger end fitting 22a to cause engagement of the exterior shaft threads 33 on the on the end fitting shaft 32 with the interior plunger threads 18 in the plunger body bore 12. While the upper plunger end fitting 22 and the lower plunger end fitting 22a may have a design such as that set forth above, it will be recognized and understood that the upper plunger end fitting 22 and/or the lower end fitting 22a may have any alternative design or designs which is/are consistent with the functional requirements of the upper plunger end fitting 22 and the lower plunger end fitting 22a.

Figure 6:
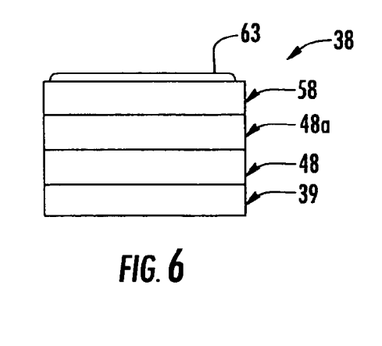
FIG. 6 is a side view of a plunger seal pack which is suitable for sealing the pump plunger in the pump barrel of the sucker rod pump.
Figure 7:
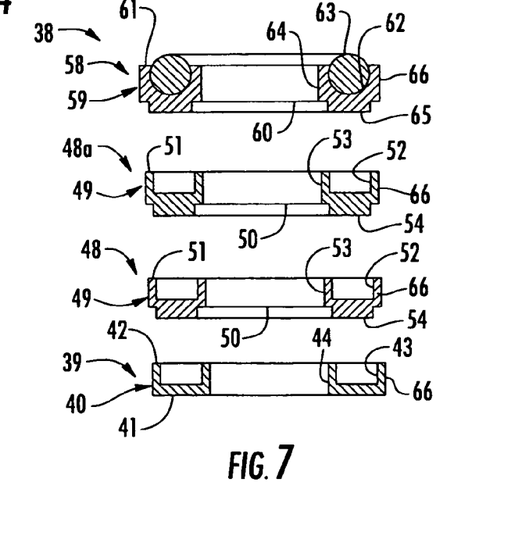
FIG. 7 is an exploded, cross-sectional view of multiple seals of the plunger seal pack.
Figure 8:
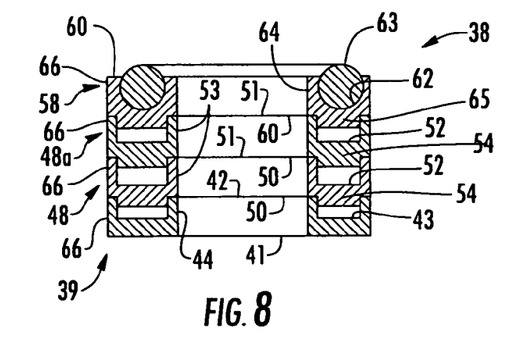
FIG. 8 is a cross-sectional view of the seals of the plunger seal pack in a seated or stacked configuration.
Figure 9:
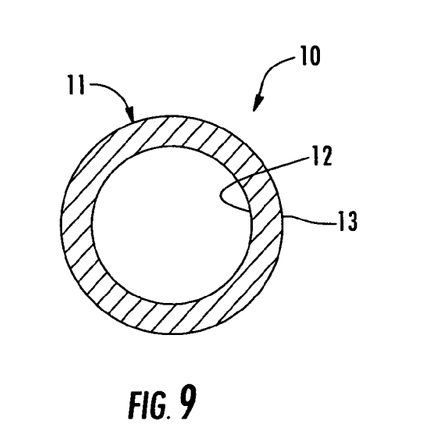
FIG. 9 is a cross-sectional view, take along section lines 9-9 in FIG. 1, of the pump plunger of the sucker rod pump.

As further illustrated in FIGS. 2 and 10, an upper plunger seal pack 38 may be sandwiched between the upper plunger end 16 of the pump plunger 10 and the end fitting base 23 of the upper plunger end fitting 22. A lower plunger seal pack 38a may be sandwiched between the lower plunger end 17 of the pump plunger 10 and the end fitting base 23 of the lower plunger end fitting 22a. As illustrated in FIGS. 6-8, the upper plunger seal pack 38 and the lower plunger seal pack 38a may include a following plunger seal 39 which engages the upper plunger end 16 or the lower plunger end 17, respectively, of the plunger body 11; a lead plunger seal 58 which engages the end fitting base 23 of the upper plunger end fitting 22 or the lower plunger end fitting 22a; and at least one middle plunger seal 48 which is sandwiched between the following plunger seal 39 and the lead plunger seal 58. In some embodiments, a pair of middle plunger seals 48 and 48a, respectively, may be sandwiched between the following plunger seal 39 and the lead plunger seal 58, as illustrated. As illustrated in FIG. 10, the following plunger seal 39, the middle plunger seal 48 or seals 48, 48a and the lead plunger seal 58 may stack or nest with each other to form a fluid-tight seal between the plunger body bore 12 of the plunger body 11 and the pump barrel bore 2a (FIG. 1) of the pump barrel 2 as the pump plunger 10 reciprocates inside the pump barrel bore 2a of the pump barrel 2 during operation of the sucker rod pump 1. The following plunger seal 39, the middle plunger seals 48, 48a and the lead plunger seal 58 may each form an independent seal with the interior surface of the pump barrel bore 2a, preventing blow-back of well fluids between the pump plunger 10 and the pump barrel 2 during operation of the sucker rod pump 1. Like the upper plunger seal pack 38, the lower plunger seal pack 38a (FIGS. 2 and 10) may have a following plunger seal 39, a lead plunger seal 58 and at least one middle plunger seal 48 sandwiched between the following plunger seal 39 and the lead plunger seal 58. While the upper plunger seal pack 38 and the lower plunger seal pack 38a have each been described as including the lead plunger seal 58, the following plunger seal 39 and at least one middle plunger seal 48, as used herein the term "plunger seal pack" includes at least one seal and may include more than four seals.

As illustrated in FIG. 7, the following plunger seal 39 of each of the upper plunger seal pack 38 and the lower plunger seal pack 38a may include an annular following plunger seal body 40 having a seal opening 44. The following plunger seal body 40 may have a generally flat or planar inside seal surface 41 and a generally flat or planar outside seal surface 42 which is parallel and spaced-apart with respect to the inside seal surface 41. An annular seal lip receptacle 43 may extend into the outside seal surface 42 for purposes which will be hereinafter described.

As further illustrated in FIG. 7, each middle plunger seal 48, 48a of each of the upper plunger seal pack 38 and the lower plunger seal pack 38a may include an annular middle plunger seal body 49 having a seal opening 53. The middle plunger seal body 49 may have a generally flat or planar inside seal surface 50 and a generally flat or planar outside seal surface 51 which is parallel and spaced-apart with respect to the inside seal surface 50. An annular seal lip receptacle 52 may extend into the outside seal surface 51 for purposes which will be hereinafter described. An annular seal lip 54 may extend from the inside seal surface 50 of the middle plunger seal body 49 for purposes which will be hereinafter described.

The lead plunger seal 58 of each of the upper plunger seal pack 38 and the lower plunger seal pack 38a may include an annular lead plunger seal body 59 having a seal opening 64. The lead plunger seal body 59 may have a generally flat or planar inside seal surface 60 and a generally flat or planar outside seal surface 61 which is parallel and spaced-apart with respect to the inside seal surface 60. An annular O-ring receptacle 62 may extend into the outside seal surface 61 of the lead plunger seal body 59. An O-ring 63 may be seated in the O-ring receptacle 62. An annular seal lip 65 may extend from the inside seal surface 60 of the lead plunger seal body 59 for purposes which will be hereinafter described.

In the nested, sealing configuration of the upper plunger seal pack 38 (FIG. 6) and the lower plunger seal pack 38a, the seal lip receptacle 43 of the following plunger seal 39 receives the complementary-shaped seal lip 54 of the middle plunger seal 48. The inside seal surface 50 of the middle plunger seal 48 engages the outside seal surface 42 of the following plunger seal 39. The seal lip receptacle 52 of the middle plunger seal 48 receives the complementary-shaped seal lip 54 of the middle plunger seal 48a. The inside seal surface 50 of the middle plunger seal 48a engages the outside seal surface 51 of the middle plunger seal 48. The seal lip receptacle 52 of the middle plunger seal 48a receives the complementary-shaped seal lip 65 of the lead plunger seal 58. The inside seal surface 60 of the lead plunger seal 58 engages the outside seal surface 51 of the middle plunger seal 48a. Each of the following plunger seal 39, the middle plunger seal or seals 48, 48a and the lead plunger seal 58 of each of the upper plunger seal pack 38 and the lower plunger seal pack 38a may have an annular exterior sealing surface 66 which is adapted to engage the interior surface of the pump barrel bore 2a in a fluid-tight seal when the pump plunger 10 is inserted in the pump barrel bore 2a of the pump barrel 2. As illustrated in FIGS. 7 and 8, each exterior sealing surface 66 may have a generally flat or linear configuration in cross-section.

When the upper plunger seal pack 38 is installed in place between the upper plunger end 16 of the plunger body 11 and the end fitting base 23 of the upper plunger end fitting 22, as illustrated in FIG. 10, the inside seal surface 41 (FIG. 8) of the following plunger seal 39 engages the upper plunger end 16 in a fluid-tight seal. The O-ring 63 on the lead plunger seal 58 of the upper plunger seal pack 38 engages the end fitting base 23 of the upper plunger end fitting 22 in a fluid-tight seal. Likewise, when the lower plunger seal pack 38a is installed in place between the lower plunger end 17 of the plunger body 11 and the end fitting base 23 of the lower plunger end fitting 22a, as further illustrated in FIG. 10, the inside seal surface 41 of the following plunger seal 39 engages the lower plunger end 17 in a fluid-tight seal. The O-ring 63 on the lead plunger seal 58 of the lower plunger seal pack 38a engages the end fitting base 23 of the lower plunger end fitting 22a in a fluid-tight seal. The exterior sealing surface 66 of each of the following plunger seal 39, the middle plunger seal or seals 48, 48a and the lead plunger seal 58 of each of the upper plunger seal pack 38 and the lower plunger seal pack 38a engages the interior surface of the pump barrel bore 2a in a fluid-tight seal. While the following plunger seal 39, the middle plunger seal or seals 48, 48a and the lead plunger seal 58 may have the particular structures set forth above, it will be recognized and understood that any or each of the following plunger seal 39, the middle plunger seal or seals 48, 48a and the lead plunger seal 58 may include any alternative structure(s) or design(s) which is/are consistent with the functional requirements of the upper plunger seal pack 38 and the lower plunger seal pack 38a. Moreover, each of the upper plunger seal pack 38 and the lower plunger seal pack 38a may have one, two, three, four or more plunger seals, each of which may have any design which is consistent with the functional requirements of the upper plunger seal pack 38 and the lower plunger seal pack 38a.

As illustrated in FIG. 2, the pump plunger 10 may be assembled by initially assembling the upper plunger seal pack 38 on the end fitting shaft 32 of the upper plunger end fitting 22. This may be accomplished by extending the end fitting shaft 32 of the upper plunger end fitting 22 through the registering seal openings 64, 53 and 44 (FIG. 8) of the lead plunger seal 58, middle plunger seal or seals 48, 48a and following plunger seal 39, respectively. The end fitting shaft 32 of the upper plunger end fitting 22 is attached to the plunger body 11 of the pump plunger 10 by inserting the end fitting shaft 32 in the plunger body bore 12 and rotating the upper plunger fitting 22 with respect to the plunger body 11 to threadibly engage the exterior shaft threads 33 on the end fitting shaft 32 with the interior plunger threads 18 in the plunger body bore 12. The end fitting base 23 of the upper plunger end fitting 22 may be tightened against the O-ring 63 (FIG. 8) on the lead plunger seal 58 of the upper plunger seal pack 38 by engaging a wrench (not illustrated) with the end fitting flats 26 on the end fitting body 24 and rotating the wrench typically in the conventional manner. Accordingly, the following plunger seal 39, the middle plunger seal or seals 48, 48a and the lead plunger seal 58 of the upper plunger seal pack 38 are disposed in the nested configuration (FIG. 8) and may be compressed between the upper plunger end 16 of the plunger body 11 and the end fitting base 23 of the upper plunger end fitting 22. The lower plunger seal pack 38a may be assembled at the lower plunger end 17 of the plunger body 11 and the lower plunger end fitting 22a attached to the plunger body 11 in a similar manner.

Each of the following plunger seal 39, the middle plunger seal or seals 48, 48a and the lead plunger seal 58 of each of the upper plunger seal pack 38 and the lower plunger seal pack 38a may be any durable, heat-resistant, resilient or semi-resilient material which is suitable for imparting a fluid-tight seal between the pump plunger 10 and the interior surface of the pump barrel bore 2a. In some embodiments, the following plunger seal body 40 (FIG. 7) of the following plunger seal 39 may include polyether ether ketone (PEEK). In some embodiments, the middle plunger seal body 49 of each of the middle plunger seals 48, 48a may include carbon fiber-filled polytetrafluoroethylene (PTFE), or TEFLON®. In some embodiments, the lead plunger seal body 59 of the lead plunger seal 58 may include carbon fiber-filled polytetrafluoroethylene (PTFE), or TEFLON®. The O-ring 63 of the lead plunger seal 58 may include perfluoroelastomer (FFKM). In other embodiments, each of the following plunger seal 39, the middle plunger seal or seals 48, 48a and the lead plunger seal 58 may be any alternative durable, heat-resistant, resilient or semi-resilient materials which are suitable for imparting a fluid-tight seal between the pump plunger 10 and the interior surface of the pump barrel bore 2a. The following plunger seal 39, the middle plunger seal or seals 48, 48a and the lead plunger seal 58 may be fabricated in any API (American Petroleum Institute) size depending on the diameter and size of the pump plunger 10 and the plunger end fittings 22 and 22a. While the following plunger seal 39, the middle plunger seal or seals 48, 48a and the lead plunger seal 58 may have the particular materials set forth above, it will be recognized and understood that any or each of the following plunger seal 39, the middle plunger seal or seals 48, 48a and the lead plunger seal 58 may include any alternative material or materials which is/are consistent with the functional requirements of the upper plunger seal pack 38 and the lower plunger seal pack 38a.

The sucker rod pump 1 may be assembled as follows. The upper plunger seal pack 38 and the upper plunger end fitting 22 may be assembled on the upper plunger end 16 of the plunger body 11. This may be accomplished by first placing the upper plunger seal pack 38 on the end fitting shaft 32 of the upper plunger end fitting 22 and then threading the end fitting shaft 32 of the upper plunger end fitting 22 into the upper plunger end 16 of the plunger body 11. During assembly of the upper plunger seal pack 38 and the upper plunger end fitting 22 on the upper plunger end 16, the pump plunger 10 may be immobilized in a vice or the like (not illustrated). A top cage (not illustrated), a valve rod adapter (not illustrated) or a pull tube adapter (not illustrated) may be attached to the end fitting nipple 27 of the upper plunger end fitting 22. A pull rod or a pull tube (not illustrated) may be attached to the top cage, the valve rod adaptor or the pull tube adaptor which is attached to the upper plunger end fitting 22.

The pump barrel 2 may be immobilized in a vice or the like, after which the interior surfaces of the pump barrel bore 2a may be swabbed clean and lubricated with a liberal coating of lubricant such that a heavy film of the lubricant coats the interior surfaces of the pump barrel bore 2a. The outer surfaces of the plunger body 11, the upper plunger seal pack 38 and the upper plunger end fitting 22 may also be coated with the lubricant. Next, the lower plunger end 17 of the plunger body 11 may be inserted into the pump barrel bore 2a of the pump barrel 2. The plunger body 11 may be pushed through the pump barrel bore 2a until approximately one-half the length of the plunger body 11 protrudes from the opposite end of the pump barrel bore 2a. In the case of a tubing pump (in which a pull rod is not attached to the plunger body 11), a pony rod or other long rod (not illustrated) may be used to push the plunger body 11 through the pump barrel bore 2a. Next, with the lower plunger end 17 protruding from the pump barrel bore 2a of the pump barrel 2, the lower plunger seal pack 38a and the lower end fitting 22a may be assembled on the lower plunger end 17 as was heretofore described with respect to assembly of the upper plunger seal pack 38 and the upper plunger end fitting 22. A friction wrench or the like (not illustrated) may be used to immobilize the plunger body 11 during assembly of the lower plunger seal pack 38a and the lower end fitting 22a on the plunger body 10. Lower cages or other connections (not illustrated) may be attached to the end fitting nipple 27 of the lower plunger end fitting 22a.

The pump plunger 10 may then be pushed back a short distance into the pump barrel bore 2a of the pump barrel 2, leaving the lower plunger end fitting 22a, the lower plunger seal pack 38a, the lower expanded plunger portion 13a and about ½ inch of the middle plunger portion 14 of the plunger body 11 protruding from the pump barrel bore 2a. A piece of paper or plastic (not illustrated) may be cupped under and around the protruding end of the pump plunger 10 and the end of the pump barrel 2, after which a lubricant may be poured through the opening into the recessed area between the interior surface of the pump barrel bore 2a and the middle plunger portion 14 of the pump plunger 10 until the lubricant substantially fills the recessed area. The cupped paper or plastic may be held around the pump plunger 10 and the pump barrel 2 as the pump plunger 10 is pushed back into the pump barrel bore 2a. Fittings (not illustrated) may be attached to the pump barrel 2 and the pump plunger 10 may be stroked substantially the entire length of the pump barrel bore 2a to ensure that the upper seal pack 38 and the lower seal pack 38a are properly placed on the plunger body 11. The pump barrel 2 may be rolled over halfway and the pump plunger 10 pulled through the pump barrel bore 2a again to ensure that the lubricant has coated the entire interior surface of the pump barrel bore 2a. Assembly of the sucker rod pump 1 may then be completed according to the knowledge of those skilled in the art.

In some embodiments, the lubricant which is utilized as a lubricating material in the pump plunger 10 may be a PTFE-containing liquid lubricant which may include corrosion inhibitors. The PTFE ingredient in the lubricant forms a dry film and bonds to the porous metal surfaces of the pump plunger 10 and the inside surfaces of the pump barrel 2 to lubricate the pump plunger 10 inside the pump barrel 2 in reciprocating relationship. This lubricating capability reduces friction between the pump plunger 10 and the pump barrel 2. It will be appreciated by those skilled in the art that a variety of PTFE-containing lubricants known by those skilled in the art may operate to achieve the desired lubricating results according to the knowledge of those skilled in the art.

In exemplary application, the sucker rod pump 1 may be used as a tubing pump in which the pump barrel 2 is attached to a tubing string (not illustrated) which is extended into a subterranean hydrocarbon well (not illustrated) or as an insert pump which is inserted into a tubing string for operation. A traveling valve (not illustrated) may be attached to the nipple threads 28 of the lower plunger end fitting 22a and a standing valve (not illustrated) may be placed in the pump barrel 2 beneath the traveling valve. In operation of the sucker rod pump 1, the pump plunger 10 is reciprocated in the pump barrel bore 2a of the pump barrel 2 to pump fluid hydrocarbons and other well fluids (not illustrated) from the subterranean hydrocarbon well (not illustrated) in which the sucker rod pump 1 is placed.

As the pump plunger 10 reciprocates in the pump barrel bore 2a of the pump barrel 2, the following plunger seal 39, the middle plunger seals 48, 48a and the lead plunger seal 58 of the upper plunger seal pack 38 and the lower plunger seal pack 38a, respectively, each forms an independent seal with the interior surface of the pump barrel bore 2a, preventing blowback of well fluids between the pump plunger 10 and the pump barrel 2 during operation of the sucker rod pump 1. This sealing capability of the upper plunger seal pack 38 and the lower plunger seal pack 38a prevents the leakage or "slippage" of recovered fluids past the pump plunger 10 on both the upstroke and downstroke of the pump plunger 10, thus providing complete plunger efficiency for the life of each plunger seal pack 38, 38a. Furthermore, the independent sealing capability of the following plunger seal 39, the middle plunger seals 48, 48a and the lead plunger seal 58 prolong the sealing efficacy of each plunger seal pack 38, 38a. Moreover, the upper plunger seal pack 38 and the lower plunger seal pack 38a seal out abrasive elements and contaminants from the interface between the pump plunger 10 and the interior surfaces of the pump barrel bore 2a of the pump barrel 2. Additionally, the upper plunger seal pack 38 and the lower plunger seal pack 38a allow the lubricant to remain encased in the lubrication chamber 14 (FIG. 2), enabling the interior surfaces of the pump barrel bore 2a to be lubricated on every stroke. This reduces wear, pump sticking and the accumulation of deposits between the pump plunger 10 and the pump barrel 2.

It will be appreciated by those skilled in the art that the pump plunger 10 may be fabricated in standard API (American Petroleum Institute) spray metal plunger sizes. In the event that the upper plunger seal pack 38 or the lower plunger seal pack 38a fails, the pump plunger 10 will operate as a "new" spray metal plunger in the pump barrel 2. This feature will alleviate the necessity of more frequent pump replacements.

It will be further appreciated by those skilled in the art that the pump plunger 10 is characterized by simplicity of design, having the plunger body 11, the upper plunger end fitting 22 and the lower plunger end fitting 22a. The upper plunger seal pack 38 and the lower plunger seal pack 38a can be easily placed on the end fitting shaft 32 of the upper plunger end fitting 22 and the lower plunger end fitting 22a, respectively, and each end fitting shaft 32 threaded into the plunger body bore 12 (FIG. 10) to assemble the pump plunger 10 without the use of extra tools for the purpose. Moreover, the simple design of the pump plunger 10 allows for a variety of metallurgies on the upper plunger end fitting 22 and the lower plunger end fitting 22a depending on operating condition requirements. This may allow for the replacement of only the upper plunger end fitting 22, the lower plunger end fitting 22a, the upper plunger seal pack 38 and/or the lower plunger seal pack 38a without the need to also replace the plunger body 11 during repair. The pump plunger 10 is sufficiently resistant that it can be run in any type of pump barrel 2 including but not limited to a Chrome ID barrel. The upper plunger seal pack 38 and the lower plunger seal pack 38a allow the sucker rod pump 1 to be run at virtually any depth, pressure, temperature or speed of operation.

Figure 11:
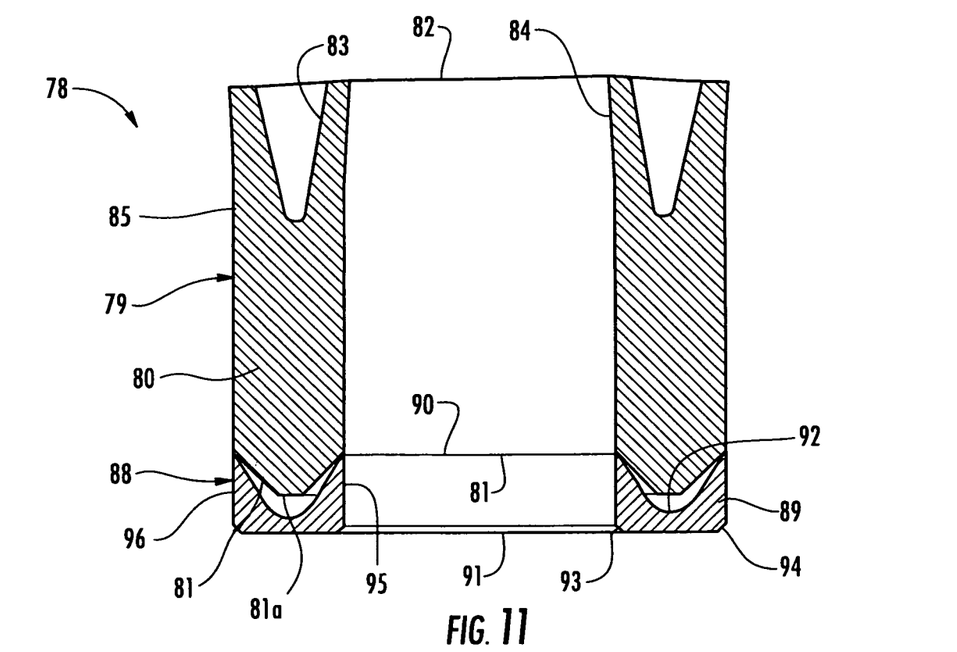
FIG. 11 is a cross-sectional view of an alternative upper plunger seal pack for the pump plunger.
Figure 12:
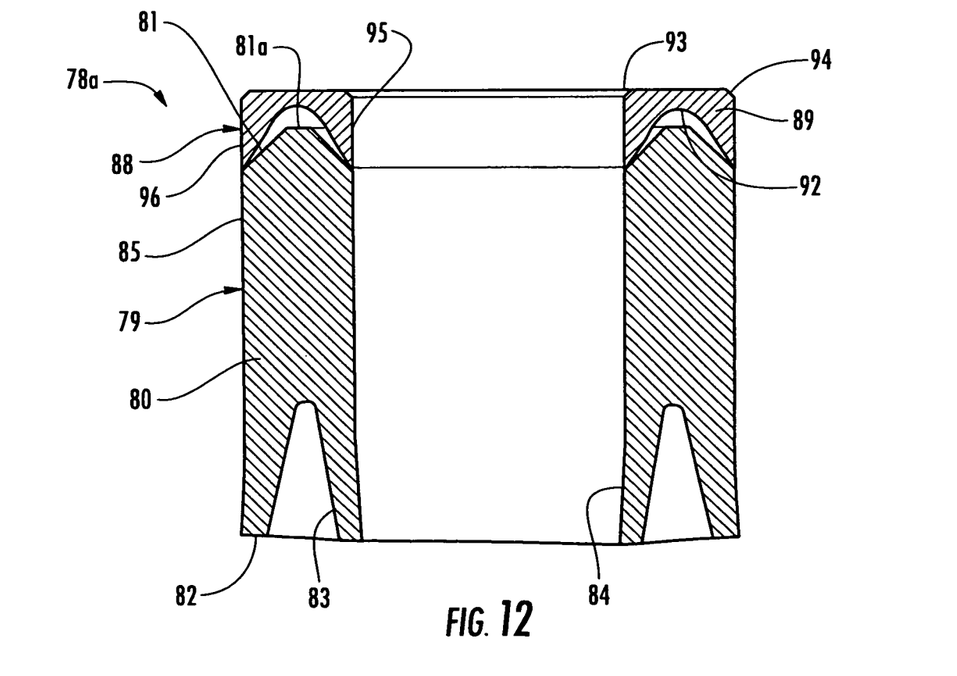
FIG. 12 is a cross-sectional view of an alternative lower plunger seal pack for the pump plunger.
Figure 13:
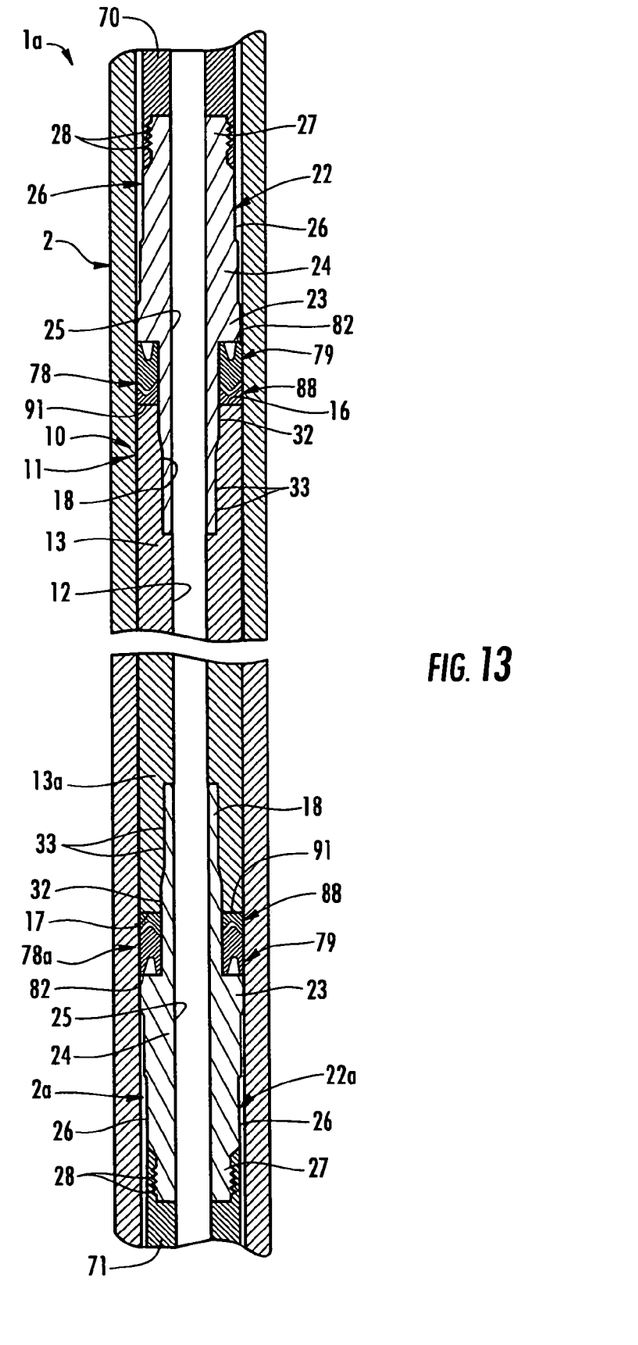
FIG. 13 is a longitudinal sectional view, partially in section, of the sucker rod pump which utilizes the pump plunger having the upper and lower plunger seal packs illustrated in FIGS. 11 and 12.

Referring next to FIGS. 11-13 of the drawings, an alternative illustrative design of an upper seal pack 78 for the pump plunger 10 is illustrated in FIG. 11 and an alternative illustrative design of the lower seal pack 78a for the pump plunger 10 is illustrated in FIG. 12. A sucker rod pump 1a which incorporates the pump plunger 10 having the upper seal pack 78 and the lower seal pack 78a is illustrated in FIG. 13. As illustrated in FIGS. 11 and 12, each of the upper plunger seal pack 78 and the lower plunger seal pack 78a may include a lead plunger seal 79 and a following plunger seal 88 which engages the lead plunger seal 79. The lead plunger seal 79 may include a generally elongated, cylindrical lead plunger seal body 80. The lead plunger seal body 80 may be elongated along the longitudinal axis of the pump plunger 10 (FIG. 13) on which the lead plunger seal 79 is installed. The lead plunger seal body 80 may have an annular inside seal surface 81, an annular outside seal surface 82 which is opposite the inside seal surface 81 and an exterior sealing surface 85. An annular seal lip 81a may protrude from the inside seal surface 81. An annular seal receptacle 83 may be provided in the outside seal surface 82. A seal opening 84 may traverse the length of the lead plunger seal body 80 from the inside seal surface 81 to the outside seal surface 82. In some embodiments, the lead plunger seal body 80 of the lead plunger seal 79 may include carbon fiber filled PTFE (polytetrafluoroethylene), although alternative materials which are consistent with the sealing requirements of the lead plunger seal 79 in the sucker rod pump 1 may be used.

As further illustrated in FIGS. 11 and 12, the following plunger seal 88 of each of the upper plunger seal pack 78 and the lower plunger seal pack 78a may include an annular following plunger seal body 89. The following plunger seal body 89 may have an annular inside seal surface 90, an annular outside seal surface 91 which is opposite the inside seal surface 90 and an exterior sealing surface 96. An annular lip receptacle 92 may extend into the inside seal surface 90. In some embodiments, an annular inside seal bevel 93 and an annular outside seal bevel 94 may be provided in the inner and outer edges, respectively, of the outside seal surface 91. A seal opening 95 may traverse the length of the following plunger seal body 89 from the inside seal surface 90 to the outside seal surface 91. In some embodiments, the following plunger seal body 89 of the following plunger seal 88 may include PEEK (polyether ether ketone), although alternative materials which are consistent with the sealing requirements of the following plunger seal 88 in the sucker rod pump 1 may be used.

Assembly of the upper plunger seal pack 78 and the lower plunger seal pack 78a on the pump plunger 10 and insertion of the pump plunger 10 in the pump barrel bore 2a of the pump barrel 2 may be carried out as was heretofore described with respect to FIGS. 1-10. As illustrated in FIG. 13, the upper plunger seal pack 78 may be oriented such that the outside seal surface 91 of the lead plunger seal 88 sealingly engages the upper plunger end 16 of the pump plunger 10 and the outside seal surface 82 of the following plunger seal 79 sealingly engages the end fitting base 23 of the upper plunger end fitting 22. The exterior sealing surface 85 of the following plunger seal 79 and the exterior sealing surface 96 of the lead plunger seal 88 sealingly engage the interior surface of the pump barrel bore 2a. The lower plunger seal pack 78a may be oriented such that the outside seal surface 91 of the following plunger seal 88 sealingly engages the lower plunger end 17 of the pump plunger 10 and the outside seal surface 82 of the lead plunger seal 79 sealingly engages the end fitting base 23 of the lower plunger end fitting 22a. The exterior sealing surface 85 of the lead plunger seal 79 and the exterior sealing surface 96 of the following plunger seal 88 sealingly engage the interior surface of the pump barrel bore 2a.

Operation of the sucker rod pump 1a may be as was heretofore described with respect to operation of the sucker rod pump 1 in FIGS. 1 and 10. Accordingly, the pump plunger 10 is reciprocated in the pump barrel bore 2a of the pump barrel 2 to pump fluid hydrocarbons and other well fluids (not illustrated) from the subterranean hydrocarbon well (not illustrated) in which the sucker rod pump 1 is placed. As the pump plunger 10 reciprocates in the pump barrel bore 2a of the pump barrel 2, the lead plunger seal 79 and the following plunger seal 88 of the upper plunger seal pack 78 and the lower plunger seal pack 78a, respectively, each forms an independent seal with the interior surface of the pump barrel bore 2a, preventing blowback of well fluids between the pump plunger 10 and the pump barrel 2 during operation of the sucker rod pump 1a. This sealing capability of the upper plunger seal pack 78 and the lower plunger seal pack 78a prevents the leakage or "slippage" of recovered fluids past the pump plunger 10 on both the upstroke and downstroke of the pump plunger 10, thus providing complete plunger efficiency for the life of each plunger seal pack 78, 78a. Furthermore, the independent sealing capability of the lead plunger seal 79 and the following plunger seal 88 prolong the sealing efficacy of each plunger seal pack 78, 78a. Moreover, the upper plunger seal pack 78 and the lower plunger seal pack 78a seal out abrasive elements and contaminants from the interface between the pump plunger 10 and the interior surfaces of the pump barrel bore 2a of the pump barrel 2. Additionally, the upper plunger seal pack 78 and the lower plunger seal pack 78a allow the lubricant to remain encased in the lubrication chamber 14 (FIG. 2), enabling the interior surfaces of the pump barrel bore 2a to be lubricated on every stroke. This reduces wear, pump sticking and the accumulation of deposits between the pump plunger 10 and the pump barrel 2.

Figure 14:
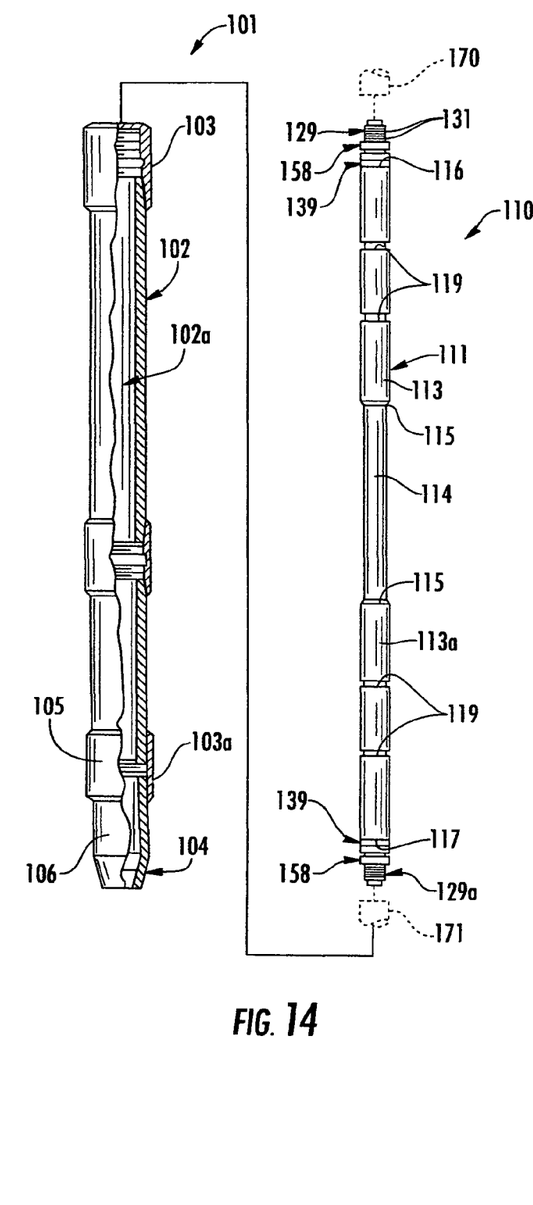
FIG. 14 is an exploded side view, partially in section, of a pump barrel and an alternative illustrative embodiment of the pump plunger, more particularly illustrating insertion of the pump plunger into the pump barrel in assembly of a sucker rod pump.
Figure 15:
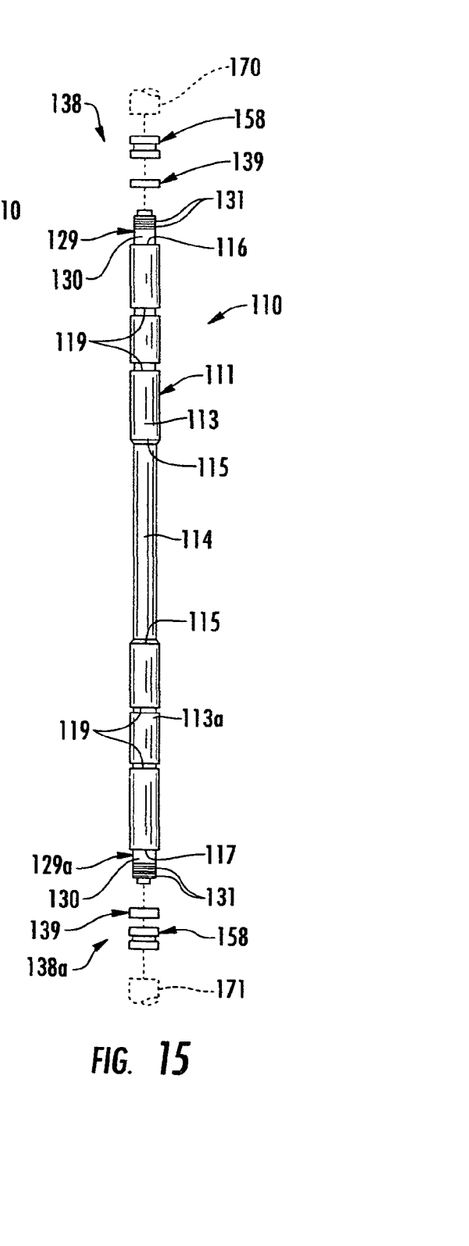
FIG. 15 is an exploded side view of the pump plunger illustrated in FIG. 14.
Figure 16:
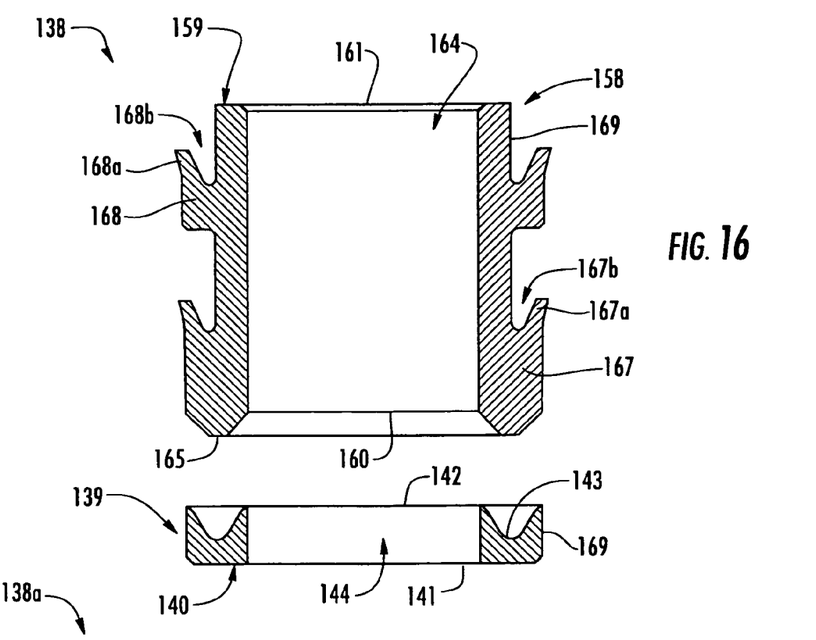
FIG. 16 is an exploded cross-sectional view of another alternative upper plunger seal pack for the pump plunger illustrated in FIG. 14.
Figure 17:
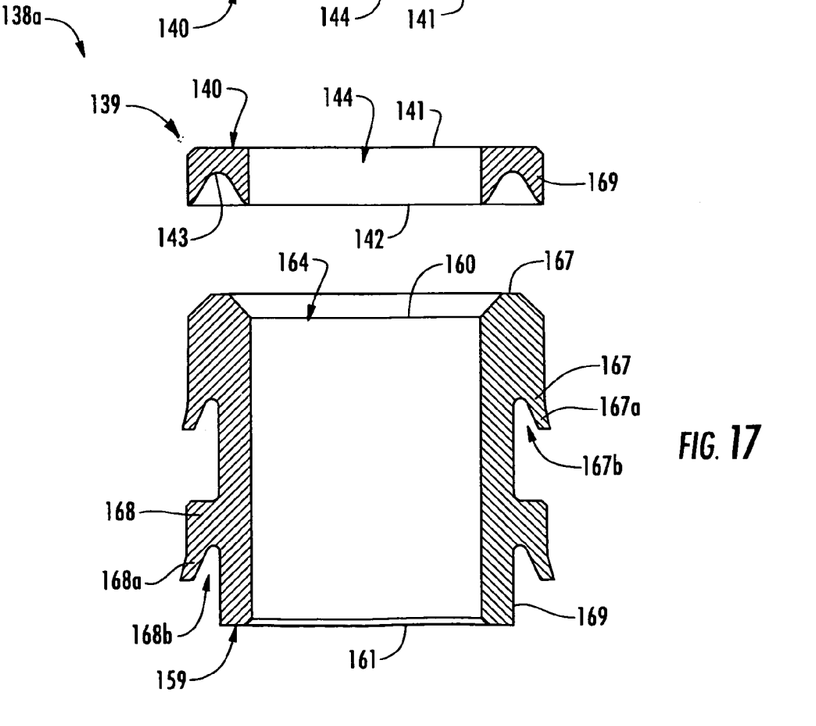
FIG. 17 is an exploded cross-sectional view of another alternative lower plunger seal pack for the pump plunger illustrated in FIG. 14.
Figure 18:
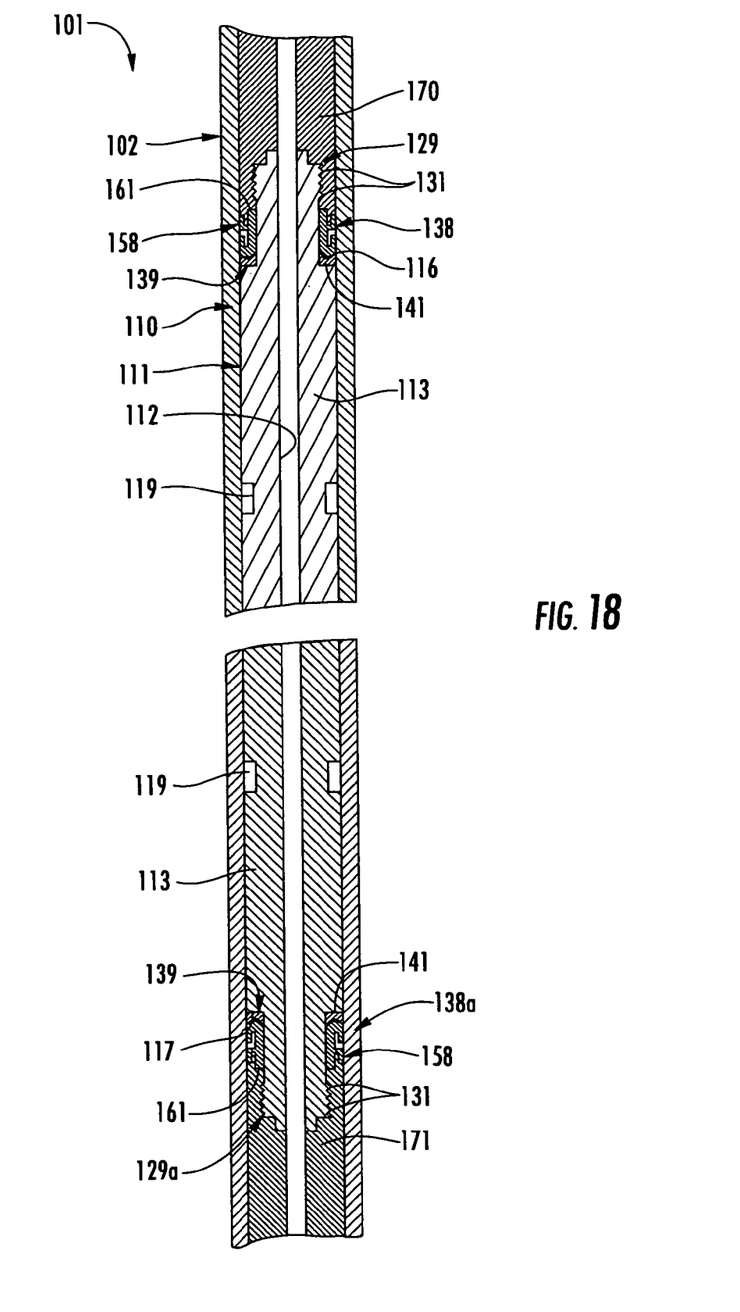
FIG. 18 is a longitudinal sectional view, partially in section, of the sucker rod pump which utilizes the pump plunger having the upper and lower plunger seal packs illustrated in FIGS. 16 and 17.

Referring next to FIGS. 14-18 of the drawings, an alternative illustrative embodiment of a pump plunger is generally indicated by reference numeral 110 in FIGS. 14, 15 and 18. In FIGS. 14 and 18, the pump plunger 110 is shown as part of a sucker rod pump 101. In the sucker rod pump 101 and the pump plunger 110 illustrated in FIGS. 14-18, elements which are analogous to the respective elements of the sucker rod pump 1 and the pump plunger 10 that was heretofore described with respect to FIGS. 1-10 are designated by the same numeral in the 100-199 series in FIGS. 14-18. The pump plunger 110 may include a generally elongated plunger body 111 having a longitudinal plunger body bore 112 (FIG. 18) through which the hydrocarbons and other well fluids (not illustrated) are pumped during operation of the sucker rod pump 101. The plunger body 111 of the pump plunger 110 may have an upper expanded plunger portion 113, a lower expanded plunger portion 113a and a narrowed middle plunger portion 114 which connects the upper expanded plunger portion 113 and the lower expanded plunger portion 113a. A plunger bevel 115 may extend between the middle plunger portion 114 and the upper expanded plunger portion 113 and between the middle plunger portion 114 and the lower expanded plunger portion 113a, respectively. As illustrated in FIG. 2, the plunger body 111 may have an upper plunger end 116 and a lower plunger end 117. In some embodiments, at least one annular plunger groove 119 may circumscribe the upper expanded plunger portion 113 and the lower expanded plunger portion 113a as is known by those skilled in the art.

An upper male plunger end 129 may extend from the upper plunger end 116 of the plunger body 111. A lower male plunger end 129a may extend from the lower plunger end 117 of the plunger body 111. The upper male plunger end 129 and the lower male plunger end 129a may be structurally integral with or fabricated in one piece with the plunger body 111 of the pump plunger 110 according to fabrication techniques which are well-known by those skilled in the art. As illustrated in FIGS. 15 and 18, each of the upper male plunger end 129 and the lower male plunger end 129a may include a generally cylindrical end fitting neck 130. Exterior end fitting threads 131 may be provided on each end fitting neck 130.

An upper plunger seal pack 138 may be placed on the end fitting neck 130 of the upper male plunger end 129. A lower plunger seal pack 138a may be placed on the end fitting neck 130 of the lower male plunger end 129a. As illustrated in FIGS. 16 and 17, each of the upper plunger seal pack 138 and the lower plunger seal pack 138a may include a following plunger seal 139 and a lead plunger seal 158 which engages the following plunger seal 139. The following plunger seal 139 may include a generally cylindrical following plunger seal body 140 having an inside seal surface 141 and an outside seal surface 142 which is opposite the inside seal surface 141. An annular seal lip receptacle 143, the purpose of which will be hereinafter described, may extend into the outside seal surface 142. A seal opening 144 may traverse the following plunger seal body 140.

The lead plunger seal 158 of each of the upper plunger seal pack 138 and the lower plunger seal pack 138a may include a generally cylindrical lead plunger seal body 159 having an inside seal surface 160 which engages the outside seal surface 142 of the following plunger seal 139 and an outside seal surface 161 which is opposite the inside seal surface 160. An annular seal lip 165 may extend from the inside seal surface 160 for insertion into the companion seal lip receptacle 143 in the outside seal surface 142 of the following plunger seal 139. The following plunger seal 139 and the lead plunger seal 158 each has an exterior sealsurface 169.

An annular, circumferential inside seal expansion 167 may extend from the exterior seal surface 169 of the lead plunger seal body 159 generally adjacent to the inside seal surface 160. An annular inside expansion lip 167a may protrude outwardly from the inside seal expansion 167. An annular inside expansion space 167b may be formed between the exterior seal surface 169 and the interior surface of the inside expansion lip 167a.

An annular, circumferential outside seal expansion 168 may extend from the exterior seal surface 169 of the lead plunger seal body 159 generally adjacent to the outside seal surface 161. An annular outside expansion lip 168a may protrude outwardly from the outside seal expansion 168. An annular outside expansion space 168b may be formed between the exterior seal surface 169 and the interior surface of the outside expansion lip 168a.

The following plunger seal 139 and the lead plunger seal 158 of each of the upper plunger seal pack 138 and the lower plunger seal pack 138a may be any durable, heat-resistant, resilient or semi-resilient material which is suitable for imparting a fluid-tight seal between the pump plunger 110 and the interior surface of the pump barrel bore 102a. In some embodiments, the following plunger seal body 140 of the following plunger seal 139 may include polyether ether ketone (PEEK). In some embodiments, the lead plunger seal body 159 of the lead plunger seal 158 may include carbon fiber-filled polytetrafluoroethylene (PTFE), or TEFLON®. In other embodiments, each of the following plunger seal 139 and the lead plunger seal 158 may be any alternative durable, heat-resistant, resilient or semi-resilient materials which are suitable for imparting a fluid-tight seal between the pump plunger 110 and the interior surface of the pump barrel bore 102a. The following plunger seal 139 and the lead plunger seal 158 may be fabricated in any API (American Petroleum Institute) size depending on the diameter and size of the pump plunger 110 and the end fitting necks 130. While the following plunger seal 139 and the lead plunger seal 158 may have the particular materials set forth above, it will be recognized and understood that any or each of the following plunger seal 139 and the lead plunger seal 158 may include any alternative material or materials which is/are consistent with the functional requirements of the upper plunger seal pack 138 and the lower plunger seal pack 138a. While the following plunger seal 139 and the lead plunger seal 158 may have the particular structures set forth above, it will be recognized and understood that any or each of the following plunger seal 139 and the lead plunger seal 158 may include any alternative structure(s) or design(s) which is/are consistent with the functional requirements of the upper plunger seal pack 138 and the lower plunger seal pack 138a. Moreover, each of the upper plunger seal pack 138 and the lower plunger seal pack 138a may have one, two, three, four or more plunger seals, each of which may have any design which is consistent with the functional requirements of the upper plunger seal pack 138 and the lower plunger seal pack 138a.

The sucker rod pump 101 may be assembled as follows. The upper plunger seal pack 138 is assembled on the end fitting neck 130 of the upper male plunger end fitting 139. This may be accomplished by initially extending or sliding the following plunger seal 139 over the end fitting threads 131 and the end fitting neck 130 and seating the inside seal surface 141 of the following plunger seal 139 against the upper plunger end 116. The lead plunger seal 158 is then extended or slid over the end fitting threads 131 and the end fitting neck 130 until the inside seal surface 160 of the lead plunger seal 158 engages the outside seal surface 142 of the following plunger seal 139, as illustrated in FIG. 18. During assembly of the upper plunger seal pack 138 on the upper male plunger end 129, the pump plunger 110 may be immobilized in a vice or the like (not illustrated). A top cage 170 or other connection (not illustrated) may be attached to the end fitting threads 131 of the upper male plunger end 129 and tightened against the seal lip 165a which protrudes from the outside seal surface 161. A pull rod or a pull tube (not illustrated) may be attached to the top cage 170 in the conventional manner.

The pump barrel 102 may be immobilized in a vice or the like, after which the interior surfaces of the pump barrel bore 102a may be swabbed clean and lubricated with a liberal coating of lubricant such that a heavy film of the lubricant coats the interior surfaces of the pump barrel bore 102a. The outer surfaces of the plunger body 111 and the upper plunger seal pack 138 may also be coated with the lubricant. Next, the lower plunger male end 129a of the plunger body 111 may be inserted into the pump barrel bore 102a of the pump barrel 102. The plunger body 111 may be pushed through the pump barrel bore 102a until approximately one-half the length of the plunger body 111 protrudes from the opposite end of the pump barrel bore 102a. In the case of a tubing pump (in which a pull rod is not attached to the plunger body 11), a pony rod or other long rod (not illustrated) may be used to push the plunger body 111 through the pump barrel bore 102a. Next, with the lower male plunger end 129a protruding from the pump barrel bore 102a of the pump barrel 102, the lower plunger seal pack 138a may be assembled on the end fitting neck 130 of the lower male plunger end 129a as was heretofore described with respect to assembly of the upper plunger seal pack 138 on the upper male plunger end 129. A friction wrench or the like (not illustrated) may be used to immobilize the plunger body 111 during assembly of the lower plunger seal pack 138a on the plunger body 110. A bottom cage 171 or other connection (not illustrated) may be attached to the end fitting threads 131 of the lower male plunger end 139a.

The pump plunger 110 may then be pushed back a short distance into the pump barrel bore 102a of the pump barrel 102, leaving the lower male plunger end 129a, the lower plunger seal pack 138a, the lower expanded plunger portion 113a and about ½ inch of the middle plunger portion 114 of the plunger body 111 protruding from the pump barrel bore 102a. A piece of paper or plastic (not illustrated) may be cupped under and around the protruding end of the pump plunger 110 and the end of the pump barrel 102, after which a lubricant may be poured through the opening into the recessed area between the interior surface of the pump barrel bore 102a and the middle plunger portion 114 of the pump plunger 110 until the lubricant substantially fills the recessed area. The cupped paper or plastic may be held around the pump plunger 110 and the pump barrel 102 as the pump plunger 110 is pushed back into the pump barrel bore 102a. Fittings (not illustrated) may be attached to the pump barrel 102 and the pump plunger 110 may be stroked substantially the entire length of the pump barrel bore 102a to ensure that the upper seal pack 138 and the lower seal pack 138a are properly placed on the plunger body 111. The pump barrel 102 may be rolled over halfway and the pump plunger 110 pulled through the pump barrel bore 102a again to ensure that the lubricant has coated the entire interior surface of the pump barrel bore 102a. Assembly of the sucker rod pump 101 may then be completed according to the knowledge of those skilled in the art.

In some embodiments, the lubricant which is utilized as a lubricating material in the pump plunger 110 may be a PTFE-containing liquid lubricant which may include corrosion inhibitors. The PTFE ingredient in the lubricant forms a dry film and bonds to the porous metal surfaces of the pump plunger 110 and the inside surfaces of the pump barrel 102 to lubricate the pump plunger 110 inside the pump barrel 102 in reciprocating relationship. This lubricating capability reduces friction between the pump plunger 110 and the pump barrel 102. It will be appreciated by those skilled in the art that a variety of PTFE-containing lubricants known by those skilled in the art may operate to achieve the desired lubricating results according to the knowledge of those skilled in the art.

Operation of the sucker rod pump 101 may be as was heretofore described with respect to operation of the sucker rod pump 1 in FIGS. 1 and 10. Accordingly, the pump plunger 110 is reciprocated in the pump barrel bore 102a of the pump barrel 102 to pump fluid hydrocarbons and other well fluids (not illustrated) from the subterranean hydrocarbon well (not illustrated) in which the sucker rod pump 101 is placed. As the pump plunger 110 reciprocates in the pump barrel bore 102a of the pump barrel 102, the following plunger seal 139 and the lead plunger seal 158 of the upper plunger seal pack 138 and the lower plunger seal pack 138a, respectively, each forms an independent seal with the interior surface of the pump barrel bore 102a, preventing blowback of well fluids between the pump plunger 110 and the pump barrel 102 during operation of the sucker rod pump 101. This sealing capability of the upper plunger seal pack 138 and the lower plunger seal pack 138a prevents the leakage or "slippage" of recovered fluids past the pump plunger 110 on both the upstroke and downstroke of the pump plunger 110, thus providing complete plunger efficiency for the life of each plunger seal pack 138, 138a. Furthermore, the independent sealing capability of the following plunger seal 139 and the lead plunger seal 158 prolong the sealing efficacy of each plunger seal pack 138, 138a. Moreover, the upper plunger seal pack 138 and the lower plunger seal pack 138a seal out abrasive elements and contaminants from the interface between the pump plunger 110 and the interior surfaces of the pump barrel bore 102a of the pump barrel 102. Additionally, the upper plunger seal pack 138 and the lower plunger seal pack 138a allow the lubricant to remain encased in the lubrication chamber 114 (FIG. 14), enabling the interior surfaces of the pump barrel bore 102a to be lubricated on every stroke. This reduces wear, pump sticking and the accumulation of deposits between the pump plunger 110 and the pump barrel 102. It will be appreciated by those skilled in the art that each of the upper plunger seal pack 138 and the lower plunger seal pack 138a may be readily removed and replaced on the respective upper male plunger end 129 and lower male plunger end 129a by unthreading the top cage 170 and the bottom cage 171 from the upper male plunger end 129 and the lower male plunger end 129a, respectively.

While various illustrative embodiments have been described above, it will be recognized and understood that various modifications can be made and the appended claims are intended to cover all such modifications which may fall within the spirit and scope of the disclosure.

What is claimed is:

1. A pump plunger for a sucker rod pump, comprising:
   an elongated plunger body having first and second plunger body ends and a longitudinal plunger body bore extending between said first and second plunger body ends;
   a first plunger end fitting releasably carried by said first plunger body end of said plunger body;
   a second plunger end fitting releasably carried by said second plunger body end of said plunger body;
   wherein each of said first plunger end fitting and said second plunger end fitting comprises an end fitting body, a threaded end fitting nipple carried by said end fitting body and a threaded end fitting shaft carried by said end fitting body and threadably engaging said plunger body;
   at least one end fitting flat in said end fitting body;
   a first plunger seal pack sandwiched between said first plunger body end and said first plunger end fitting; and
   a second plunger seal pack sandwiched between said second plunger body end and said second plunger end fitting.

2. The pump plunger of claim 1 wherein said plunger body comprises a pair of expanded plunger portions and a middle plunger portion connecting said expanded plunger portions.

3. The pump plunger of claim 1 wherein said first plunger seal pack comprises a first plurality of nesting plunger seals and said second plunger seal pack comprises a second plurality of nesting plunger seals.

4. The pump plunger of claim 3 wherein each of said first plurality of nesting plunger seals and said second plurality of nesting plunger seals comprises a lead plunger seal engaging a corresponding one of said first plunger end fitting and said second plunger end fitting, a following plunger seal engaging said plunger body and at least one middle plunger seal sandwiched between said inside plunger seal and said outside plunger seal.

5. The pump plunger of claim 4 wherein said at least one middle plunger seal comprises a pair of middle plunger seals.

6. A pump plunger for a sucker rod pump, comprising:
   an elongated plunger body having first and second plunger body ends and a longitudinal plunger body bore extending between said first and second plunger body ends;
   a first plunger end fitting releasably carried by said first plunger body end of said plunger body;
   a second plunger end fitting releasably carried by said second plunger body end of said plunger body;
   wherein each of said first plunger end fitting and said second plunger end fitting comprises an end fitting body, a threaded end fitting nipple carried by said end fitting body, a threaded end fitting shaft carried by said end fitting body and threadably engaging said plunger body and at least one end fitting flat in said end fitting body;
   a first plunger seal pack having a following plunger seal and a lead plunger seal sandwiched between said first plunger body end and said first plunger end fitting; and
   a second plunger seal pack having a following plunger seal and a lead plunger seal sandwiched between said second plunger body end and said second plunger end fitting.

7. The pump plunger of claim 6 wherein said following plunger seal of each of said first plunger seal pack and said second plunger seal pack comprises a generally elongated, cylindrical following plunger seal body having an inside seal surface engaging said lead plunger seal, an outside seal surface opposite said inside seal surface and engaging a corresponding one of said first plunger end fitting and said second plunger end fitting and a seal opening traversing said following plunger seal body.

8. The pump plunger of claim 7 wherein said lead plunger seal comprises an annular lead plunger seal body having an inside seal surface engaging said inside seal surface of said following plunger seal and an outside seal surface engaging a corresponding one of said first plunger body end and said second plunger body end of said plunger body.

9. The pump plunger of claim 8 further comprising a lip receptacle in said inside seal surface of said lead plunger seal and a seal lip on said inside seal surface of said following plunger seal body and inserted in said lip receptacle.

10. A pump plunger for a sucker rod pump, comprising:
    an elongated plunger body having first and second plunger body ends and a longitudinal plunger body bore extending between said first and second plunger body ends;
    a first male plunger end integral with said first plunger body end of said plunger body;
    a second male plunger end integral with said second plunger body end of said plunger body;
    a first plunger seal pack having at least one first plunger seal detachably carried by said first male plunger end by sliding of said at least one plunger seal over said first male plunger end;
    a second plunger seal pack having at least one second plunger seal detachably carried by said second male plunger end by sliding of said at least one plunger seal over said second male plunger end; and
    wherein said first male plunger end comprises a first end fitting neck extending from said first plunger body end and receiving said first plunger seal pack and a first set of end fitting threads on said first end fitting neck, and said second male plunger end comprises a second end fitting neck extending from said second plunger body end and receiving said second plunger seal pack and a second set of end fitting threads on said second end fitting neck.

11. A pump plunger for a sucker rod pump, comprising:
an elongated plunger body having first and second plunger body ends and a longitudinal plunger body bore extending between said first and second plunger body ends;
a first male plunger end integral with said first plunger body end of said plunger body;
a second male plunger end integral with said second plunger body end of said plunger body;
a first plunger seal pack having at least one first plunger seal detachably carried by said first male plunger end by sliding of said at least one plunger seal over said first male plunger end;
a second plunger seal pack having at least one second plunger seal detachably carried by said second male plunger end by sliding of said at least one plunger seal over said second male plunger end; and
said first plunger seal pack and said second plunger seal pack each comprises a lead plunger seal and a following plunger seal engaging said lead plunger seal.

12. The pump plunger of claim 11 wherein said lead plunger seal comprises a generally cylindrical lead plunger seal body having an inside seal surface, an outside seal surface opposite said inside seal surface, a seal opening traversing said lead plunger seal body, an exterior sealing surface opposite said seal opening and at least one seal expansion extending from and spaced-apart with respect to said exterior sealing surface and wherein said following plunger seal comprises a generally cylindrical following plunger seal body having an inside seal surface, an outside seal surface opposite said inside seal surface and engaging said inside seal surface of said lead plunger seal and a seal opening traversing said following plunger seal body.

13. The pump plunger of claim 12 wherein said at least one seal expansion comprises a pair of spaced-apart seal expansions extending from and spaced-apart with respect to said exterior sealing surface.

\* \* \* \* \*